Figure 1:
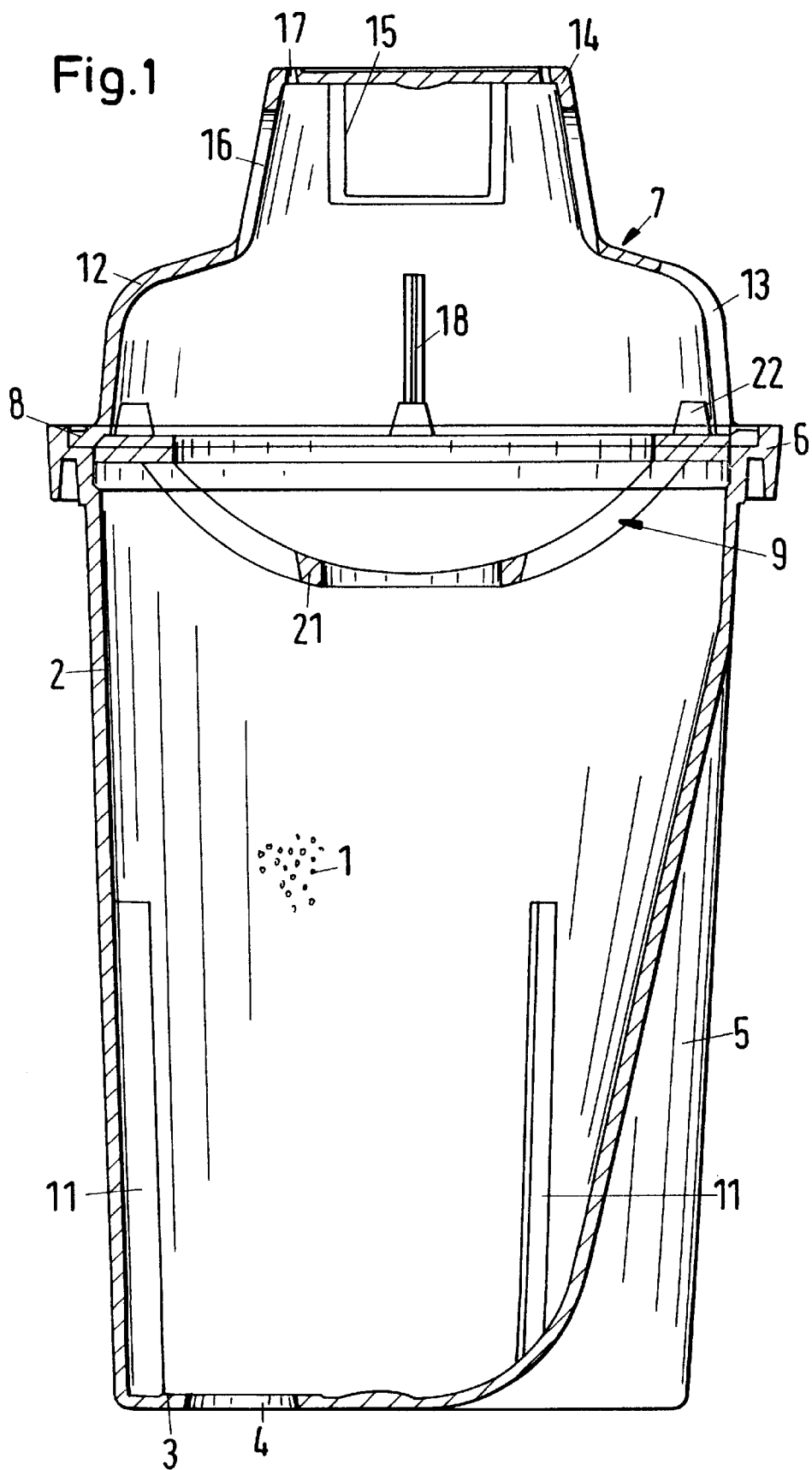

United States Patent [19]
Weyrauch

[11] Patent Number: 6,012,232
[45] Date of Patent: Jan. 11, 2000

[54] THROUGH-FLOW CUP WHICH CAN BE FILLED WITH GRANULE MATERIAL

[75] Inventor: Detlev Weyrauch, Kleinmaischeid, Germany

[73] Assignee: BRITA Wasser-Filter-Systeme GmbH, Taunusstein, Germany

[21] Appl. No.: 09/109,433

[22] Filed: Jul. 2, 1998

[30] Foreign Application Priority Data

Mar. 28, 1998 [DE] Germany ............................ 198 14 008

[51] Int. Cl.[7] .................................................. F26B 19/00
[52] U.S. Cl. ...................................... 34/61; 34/82; 34/95
[58] Field of Search ............................... 34/329, 353, 60, 34/61, 73, 80, 82, 90, 95; 264/255, 165, 173.16, 176.1; 428/297.4, 317.9, 305.5, 316.6

[56] References Cited

U.S. PATENT DOCUMENTS

| | | | |
|---|---|---|---|
| 4,686,776 | 8/1987 | Matsubara | 34/95 |
| 4,800,841 | 1/1989 | Yananton et al. | 119/168 |
| 5,005,770 | 4/1991 | Suessegger | 34/397 X |
| 5,436,066 | 7/1995 | Chen | 428/297.4 |
| 5,685,087 | 11/1997 | Flaugher et al. | 34/95 X |
| 5,703,225 | 12/1997 | Shet et al. | 34/95 X |
| 5,763,067 | 6/1998 | Bruggemann et al. | 428/317.9 |
| 5,907,908 | 6/1999 | Cunanan et al. | 34/61 |
| 5,911,937 | 6/1999 | Hekal | 34/95 X |

OTHER PUBLICATIONS

Osterreichisches Chemiefaser–Institut, Flöss asse 8, A–1041, Vienna, Austria, "Fiber Reinforcing Material Fixing for Airplane, Automobile and Sport Article Industry", International Chemical Fiber Meeting, Dornbirn, Germany 1983.

Primary Examiner—Henry Bennett
Assistant Examiner—Steve Gravini
Attorney, Agent, or Firm—Michael L. Dunn

[57] ABSTRACT

Described is a through-flow cup which can be filled with a granule material and through which a liquid to be treated can flow, having side walls and sieves which are disposed at the ends thereof and by means of which the liquid can flow through the granule material in the interior of the through-flow cup and the granule material is substantially non-losably held.

To improve such a through-flow cup to the effect that the incoming flow of liquid and at the same time any discharge flow of gases are offered the lowest possible level of resistance, it is provided in accordance with the invention that at least one sieve has a flat textile article in which plastic fibres of at least two different kinds are connected together to form a hybrid, wherein the one kind of plastic fibres contains hydrophilic components and the other kind of plastic fibres contains hydrophobic components.

25 Claims, 4 Drawing Sheets

THROUGH-FLOW CUP WHICH CAN BE FILLED WITH GRANULE MATERIAL

BACKGROUND OF THE INVENTION

The invention concerns a through-flow cup which can be filled with a granule material and through which can flow a liquid to be treated, having side walls and sieves which are disposed at the ends thereof and by means of which the liquid can flow through the granule material in the interior of the through-flow cup and the granule material is substantially non-losably held.

Filter devices are known for filtering, purifying or otherwise treating liquids, such filter devices having as the through-flow cup a given form of cartridge which is filled with granule-like ion exchanger and/or activated carbon. The water to be filtered is introduced at the top through a sieve cover and leaves the filter cup downwardly through its sieve at its bottom. The known filter device is fitted into a funnel member of a water purification apparatus, which is provided for that purpose and which is fitted onto a collecting or receiving container for filtered liquid and which is preferably closed at the top by a removable cover. In that way tap water can be improved for preparing tea or the like.

The known filter cups have plastic portions provided with slots as sieves in the cover and/or the bottom. Those slots retain the filter material which is in granule form in the filter cup. In order however to afford the liquid flowing through the cup the largest possible surface area of filter material or to compel the liquid to be subjected to an adsorption activity which is as intensive and extensive as possible, filter particles of small size are used. In that respect particles of about 200 μm and smaller occur in the filter material. The operative surface area offered to the liquid to be filtered, as it flows through the apparatus, is therefore gratifyingly large. That advantage however also involves the disadvantage that some of those very small particles of granule material pass through the intake openings in the cover and the outlet openings in the bottom. Those particles which float in the purified liquid are not wanted by the user but are a nuisance factor.

In terms of injection moulding procedures however it is not possible to fall below the size of a retaining slot in the cover and/or the bottom, that is to say in the sieve in question. In particular activated carbon particles can be of a flake-like or plate-like shape whose minimum dimension can be 250 μm or less so that it is precisely those particles which are optically clearly visible to the end user that can pass through the intake and outlet slots. In terms of injection moulding procedure however the slot width of about 200 μm represents the lower limit and it is not possible to reduce that dimension further.

Therefore, the changeover has already been made to the use of flat textile articles in the form of fleeces or non-woven cloths as sieves at top and/or bottom in a filter cup. Alternatively sieve cloths which are injection-moulded from plastic material with a small pore size of for example 200 μm have also already been produced. In regard thereto however for reasons which it has hitherto not been possible to explain difficulties have occurred when the liquid flows through that kind of sieve cloth, even when it only involved water. The surface tension of a liquid is known, which has an adverse effect in particular when dealing with small sieve pores, to the effect that the liquid is considerably prevented from flowing through and is even partially blocked. Attempts to use hydrophilised plastic cloths for the sieves have not led to the desired results.

Therefore a sieve cloth has been developed, which is curved in itself. In that way it was possible for the internal volume of a through-flow cup to be filled with the granule material to an extent of about 86% to 95%, and nonetheless a good through-flow of the liquid is achieved while affording an advantageous capability for retaining the granule material.

A sieve configuration of the utmost simplicity can contribute to simplifying production, assembly and also use, while the through-flow capability could also be improved even with a very small pore size which is reduced still further in comparison with the known sieves.

In preparation of the invention it was found that it is possible to produce a sieve cloth with very small pores so that the escape of particles can be greatly reduced. If in addition hydrophilic plastic fibres are selected as the plastic material, that then gives a very good through-flow capability for liquids in particular for water. It was found however, and this is a disadvantage, that sheets of water are formed in the meshes or pores of such sieve cloths consisting of hydrophilic plastic fibres, and such sheets of water, like a skin, seal the cloth in regard to an air flow. In practice a good purification effect of a through-flow cup of the known kind involves rising gases so that at least the sieve at the intake end would have to exhibit a good venting function. A hydrophilic cloth however is not suitable to afford such a venting function.

Now however there are hydrophobic plastic fibres which could be used to produce sieves of the desired kind. Even if the pore size involved is small, the above-described sheets of water are not formed, by virtue of the low surface tension. Tests with water have shown that in contrast the water comes together and contracts to form a drop on the surface of a hydrophobic cloth. This suffers from the disadvantage however that the through-flow capacity of the sieve for water is impeded.

Hybrid composite materials are admittedly already known but they are used for improving the mechanical properties of composite materials, thus for example for the design of surfaces in shipbuilding, in regard to surfboards or in Formula 1 racing cars.

The object of the present invention is to provide a through-flow cup of the kind set forth in the opening part of this specification in which, as an improvement, the minimum level of resistance is opposed to the incoming flow of liquid and at the same time any discharge flow of gases. In that respect similar conditions may preferably also be desired on the discharge flow side.

In accordance with the invention that object is attained in that at least one sieve has a flat textile article in which plastic fibres of at least two different kinds are joined together to form a hybrid, wherein the one kind of plastic fibres contains hydrophilic components and the other kind of plastic fibres contains hydrophobic components. It is particularly important for the flat textile article to be provided for the sieve on the feed flow side and the desired effect is already achieved by the arrangement in accordance with the invention if at least a part of the sieve is provided with a flat textile structure in accordance with the invention. The term "textile" in connection with the flat textile article or structure is used to mean threads or yarns of different materials. In this sense plastic threads or plastic fibres are also embraced by the term textile. These flat textile articles can be for example a fibre fleece or non-woven material, a mesh article or also cloth.

The particularity of the invention is that there is a first kind of plastic fibres with hydrophilic properties and a second kind of plastic fibres with hydrophobic components. In accordance with the invention the term plastic fibres is used to denote fibres, yarns or threads which have plastic material. This may involve fibres which entirely or partially comprise plastic material. What is important is their property of being hydrophilic or hydrophobic respectively, acting in relation to the exterior. A hybrid is formed by combining the plastic fibres according to the invention together.

Hybrids are already known in connection with composite materials. In that situation hybrids are produced by embedding two or more fibres in a matrix. In the case of the known composite materials as are used for example in shipbuilding the hybrids are interpreted like alloys in metallurgy. The main aim is so to optimise the material (the hybrid or the alloy) that the material satisfies the specific requirements involved in terms of performance and costs. In the known case strength, stiffness, impact strength and other generally mechanical properties are the important considerations.

In accordance with the invention a hybrid is a flat textile article or structure in which both the property of being hydrophilic and also the property of being hydrophobic occur at the same time and/or side-by-side. That surprisingly provides that liquid which passes into the through-flow cup from above is satisfactorily passed therethrough because the liquid sufficiently encounters plastic fibres with hydrophilic properties while at the same time rising gases forming a discharge flow, for example including air, sufficiently encounter hydrophobic plastic fibres.

In an advantageous development the flat textile article of the sieve is a hybrid cloth which is made up of hydrophilic and hydrophobic fibres. It is admittedly also possible to use as the flat textile article fleeces in which the material is not held together by weaving warp and weft, but by virtue of adhesion which is inherent in the plastic fibres or which is achieved by preparation thereof. It is admittedly also possible in accordance with the invention to use flat textile articles which are produced by knitting and loop mesh formation. A cloth however is particularly advantageous. Desirably such flat textile articles are produced by rightangled intersection of weft and warp threads in accordance with the rules of the theory of interlacing. As is known, there are here four different kinds of interlacing with which a hybrid cloth for the sieve can be produced.

In that respect, in accordance with the invention it is particularly advantageous if the hybrid cloth has purely hydrophilic and purely hydrophobic regions. The liquid to be purified or filtered then flows through the sieve areas with flat textile articles not just past a few hydrophobic and hydrophilic plastic threads or fibres respectively, but there are provided relatively large hydrophilic and hydrophobic regions respectively, as required. Such regions can be of the order of 1 mm by 1 mm and up to 40 mm by 40 mm. There are forms of interlacing in which the cloth is subdivided in a chessboard-like manner into purely hydrophilic, purely hydrophobic and hybrid areas if in particular the weft and warp threads are suitably distributed.

Desirably in accordance with the invention the plastic material of the hydrophilic fibres contains polyester (PES) or polyamide (PA) and the plastic material of the hydrophobic fibres contains polypropylene (PP) or polyethylene (PE). It is particularly preferred if the respective fibre comprises the above-mentioned plastic material. Advantageous tests have been implemented with hydrophilic polyester threads and hydrophobic polypropylene-threads.

In accordance with a further teaching of the invention however it is also possible to provide that the hydrophilic fibre comprises a hydrophilised plastic material and the hydrophobic fibre comprises a hydrophobised plastic material.

The hydrophilic part of the molecule exhibits a pronounced interaction with polar solvents, in particular with water. Typical hydrophilic groups are carboxylate, sulphate and sulphonate and optionally substituted ammonium functions or polyester chains. Hydrophilisation is a textilechemical measure for increasing the affinity for water or absorptive capacity and moisture transportation capability of synthetic fibres. Hydrophilisation is effected by means of hydrophilisation agents which are known per se, for example ethoxylation products.

Typical hydrophobic groups are for example long-chain or aromatic hydrocarbon residues which can also be perfluorinated. Hydrophobisation agents which are used for the hydrophobisation operation cover for example textiles or leather with a thin layer of hydrophobic groups such as for example longer alkyl chains. Drops of water bead on hydrophobised materials without wetting them.

It is also desirable in accordance with the invention if the flat textile article of the sieve is connected to support ribs by injection moulding, welding, gluing or the like. In that way the flat textile article or structure of the sieve with the properties that are desired in accordance with the invention can be fixedly or releasably mounted in the bottom or cover region of a through-flow cup and afforded good mechanical support by means of intermediate ribs. In that connection, curved configurations of a sieve are also possible.

It is advantageous if in accordance with the invention the size of the pores of the flat textile article is between 10 $\mu$m to 200 $\mu$m and preferably between 20 $\mu$m and 100 $\mu$m. If a sieve on a through-flow cup is provided with flat textile articles of that kind, it is then satisfactorily possible to prevent the particle escape of even such fine-grain granules. At the same time the flat textile article in the cover of the through-flow cup, for example a filter cartridge, offers the lowest possible resistance to the incoming flow of water on the one hand while on the other hand it also has an adequate level of gas-permeability for the discharge flow of gases affording the required venting effect. That is achieved by the use of the hydrophilic and therebeside the hydrophobic regions which are arranged in uniformly or irregularly distributed fashion over the surface of the sieve.

The hydrophilic fibres or threads used can be for example threads of polyester or polyamide. Flat textile articles comprising those fibres have a very good through-flow capability for liquids, in particular for water.

Polypropylene or polyethylene can be used as the hydrophobic threads or fibres. By virtue of the low level of surface tension involved sheets of liquid or water cannot be formed on regions with pure hydrophobic threads or fibres, in particular with hydrophobic cloths. For example the water on the surface of such a flat article draws together and contracts to form spherical drops of water. It does not do any harm if that causes the through-flow capability for liquid and in particular water to be impeded to a greater or lesser degree for the fluid then flows through the adjacent hydrophilic regions.

Figure 2:
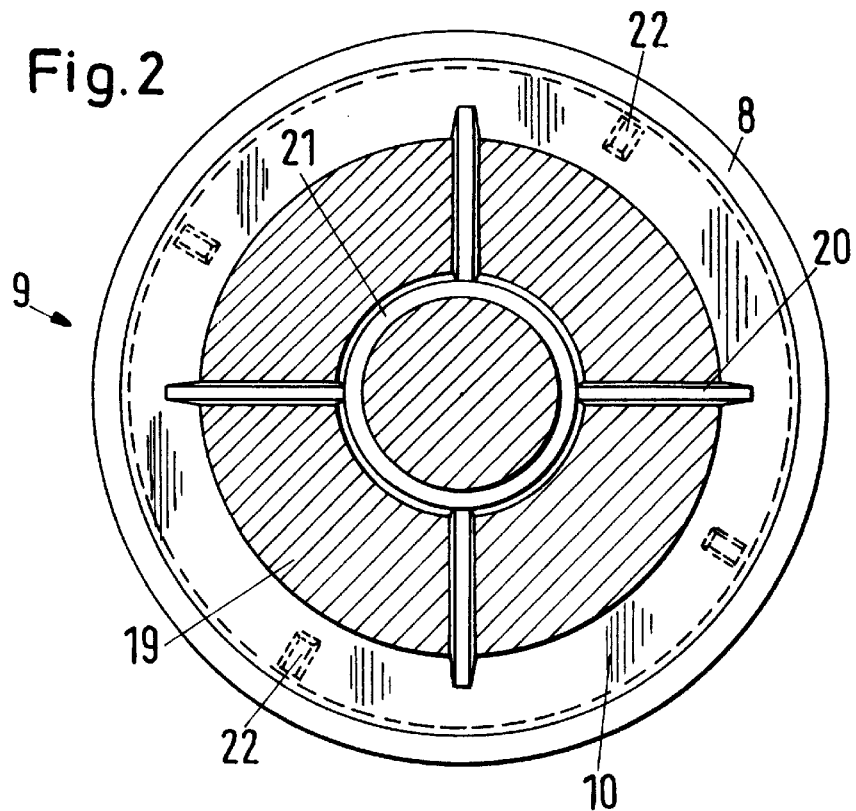
Figure 3:
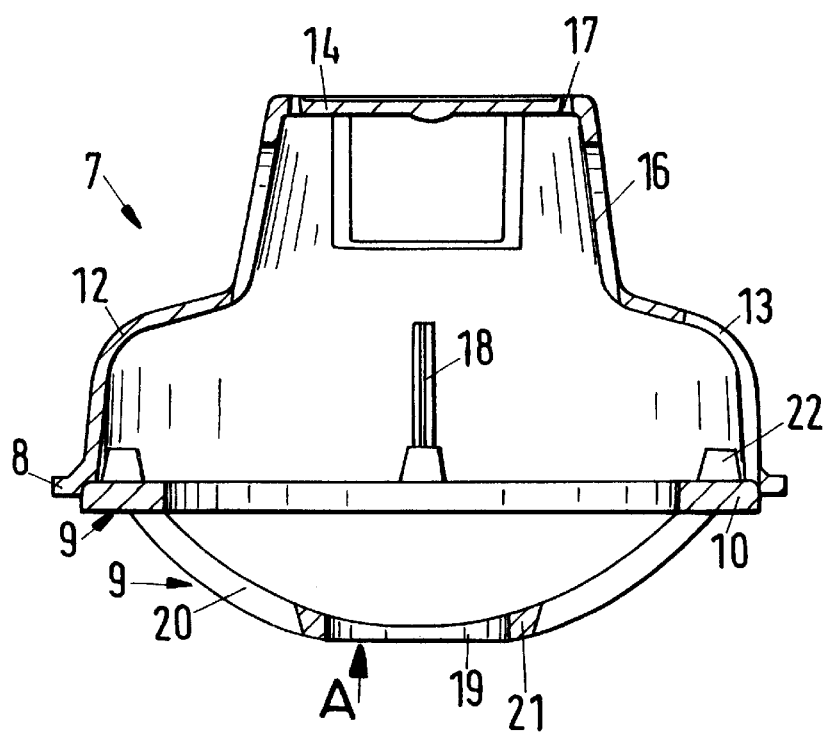
Figure 4:
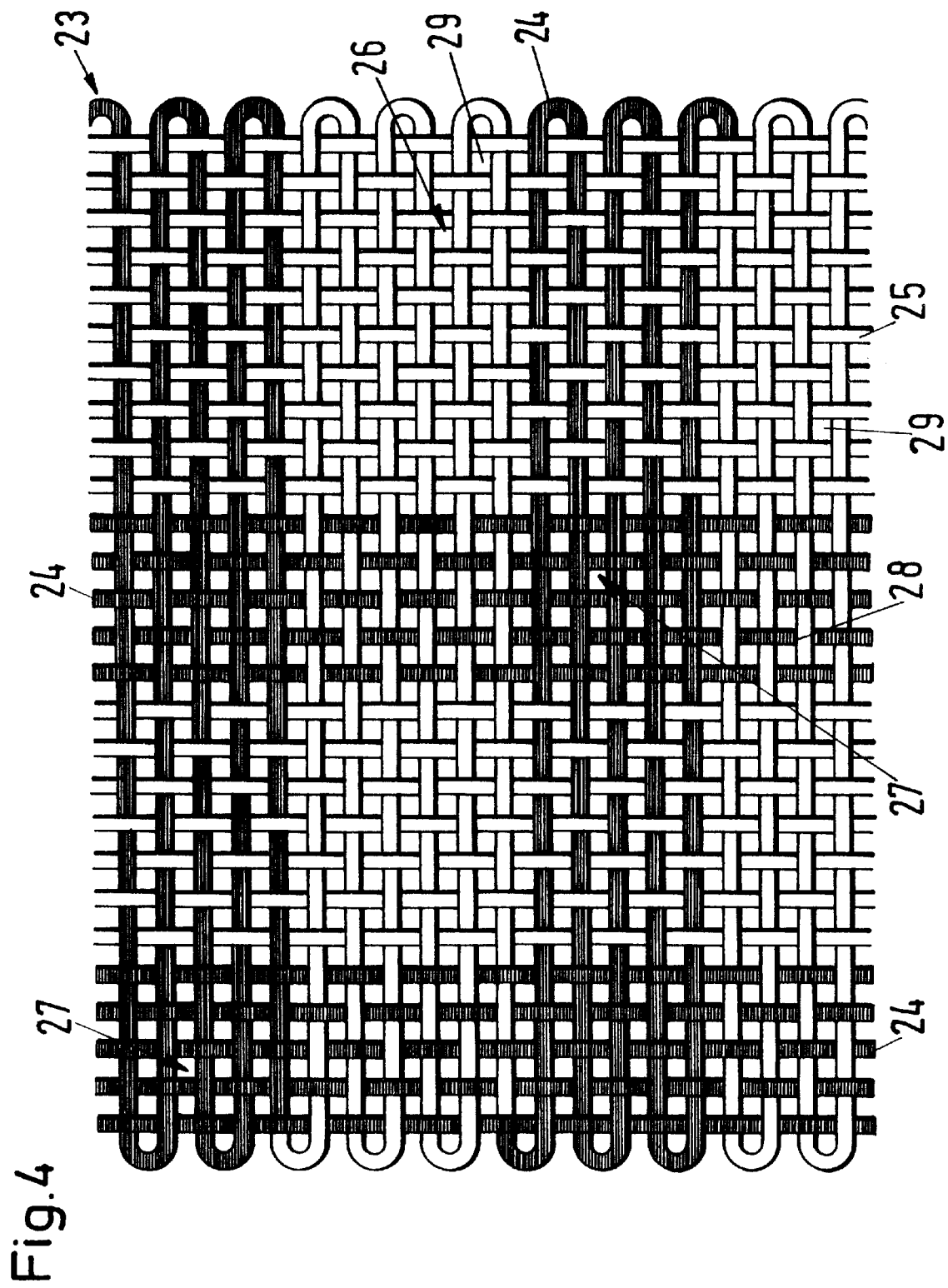
Figure 5:
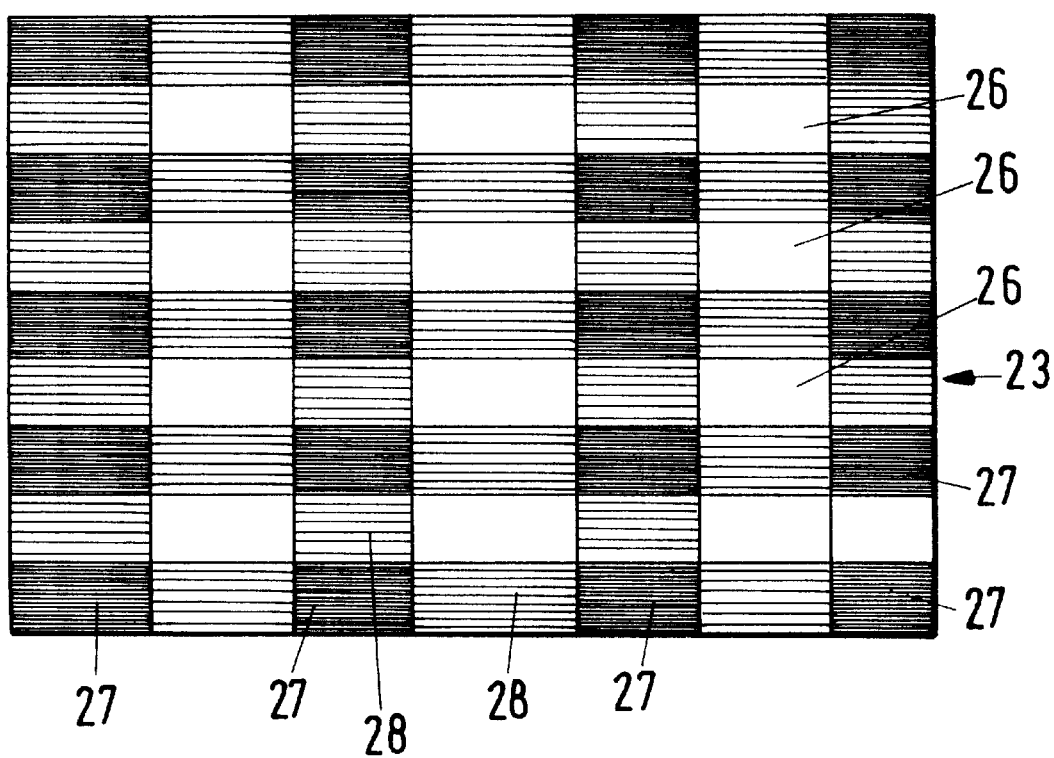

It is particularly advantageous if the plastic fibres or plastic threads comprise a unitary material, that is to say in the one case hydrophilic plastic material alone and in the other case hydrophobic plastic material alone. The thread itself therefore does not contain plastic material mixtures. Particularly in the case of cloth as the flat textile article it is possible in that way to produce pure hydrophilic regions and therebeside pure hydrophobic regions. In the case of a canvas cloth for example it is not possible, for reasons related to the weaving procedure, to avoid the occurrence of a mixed or hybrid zone between pure hydrophilic zones and pure hydrophobic zones which are arranged therebeside:

Further advantages, features and possible uses of the present invention are apparent from the following description of preferred embodiments with reference to the accompanying drawings in which:

FIG. 1 is a view in cross-section through a through-flow cup of a specific embodiment according to the invention, FIG. 2 is a plan view onto the curved sieve at the upper intake end of the through-flow cup, as viewed from the interior of the cup, FIG. 3 is a view in cross-section through the cover with the intake-end sieve mounted thereon, FIG. 4 is a diagrammatic view of a hybrid cloth in the form of a canvas cloth, and FIG. 5 shows a flat textile article with a chessboard-like arrangement of hydrophilic, hydrophobic and mixed regions.

The through-flow or continuous-flow cup which is shown generally in cross-section in FIG. 1 comprises, as its lower part, a cup 2 which is filled with grain filter material 1 and whose bottom 3 has outlet openings 4 with sieve devices (not shown) and is extended inclinedly inwardly upwardly at one location, forming a venting recess 5. The side walls of the through-flow cup 2 terminate at the top in a sealing flange 6 which includes a notional horizontal plane; the entire arrangement further comprises a lid or cover which is generally identified by reference numeral 7 and whose outer lower flange 8 terminates at the same notional horizontal plane and is suitably fitted into the sealing flange in such a way that a liquid-tight connection, for example a weld, is easily possible. Besides the through-flow cup 2 and the cover 7 which is fitted onto same the filter device, as a third part, has a sieve 9 which is disposed at the intake flow end of the device and which has a holding ring 10 which also includes the notional horizontal plane. By virtue of that configuration the holding ring 10 of the sieve 9 fits to the cover 7 and the through-flow cup 2 in such a way that the three parts can be liquid-tightly connected together, for example welded, in the region of the common connecting plane.

The Figure additionally shows stacking ribs 11 which extend upwardly approximately over half the height of the through-flow cup 2 from the bottom 3 and which are arranged on the side walls in uniformly distributed array in angular relationship on the inside thereof, for example in threes. The finished through-flow cups 2 are fitted onto those stacking ribs 11 after they have been fitted one into the other for storage purposes. Prior to assembly of the entire filter device the empty through-flow cups 2 can therefore be stored in a magazine in string-like stacks.

The cover 7 comprises a lower outer portion 12 beside the outside flange 8, while provided in the surface thereof in a ring-like array are intake openings 13 for the liquid to be filtered. The respective vertical section through the cover 7 shown in each of FIGS. 1 and 3 is such that it extends precisely through an intake opening 13, on the right-hand side of the respective Figure.

That outer portion 12 of the cover 7 reduces in an upward direction and terminates in a gripping portion 14 having a gripping recess 15 and venting slots and a number of venting holes 17 which are arranged thereabove and through which air which rises from below in operation can escape to the exterior of the filter device. Finally. disposed on the inside surface of the cover 7 are holding ribs 18 providing a support surface for the sieve 9 in the cover 7.

The sieve 9 which in plan view onto FIG. 3 is primarily visible from below in the direction of the arrow A at the centre comprises a flat textile article or structure 19 which is in the form of a portion of a sphere and which is indicated by inclined hatching and which is shown on an enlarged scale in FIG. 5 while a portion thereof is shown on a still further enlarged scale in FIG. 4. The entire hatched surface of the sieve 9 represents the flat surface structure 19 which projects downwardly in the direction of the filter material 1 and which in this case is curved and which is injection moulded into the flat holding ring 10. Ribs 20 with a centrally arranged annular rib 21 are also injection moulded on the flat textile article 19 and hold it in a stable shape in the form of a portion of a sphere.

Four positioning knobs 22 are disposed on the holding ring 10 in a uniformly distributed array at the periphery on the side which is remote from the curvature downwardly towards the through-flow cup 2, that is to say at an upward position in FIGS. 1 and 3 which also represent the operating configuration. The positioning knobs 22 project upwardly in such a way that they encounter the support surface of the four holding ribs 18 in the cover 7 when the holding ring 10 is in the correct position. This is shown in the Figures.

After the through-flow cup 2, the cover 7 and the sieve 9 are finished the latter can be moved into the position shown in FIG. 3, in which the positioning knobs 22 are caused to bear against the holding ribs 18 and the holding ring 10 is disposed on the peripheral flange 8 of the cover 7. In that arrangement, the sieve 9 is liquid-tightly welded to the cover 7.

The through-flow cup 2 is filled with filter material 1, whereupon the cover 7 is moved into the position shown in FIG. 1 and the flange 8 is liquid-tightly welded to the sealing flange 6.

The filter device of FIG. 1, which is produced in that way, can then be fitted into a filter apparatus (not shown) and used by the end consumer. The liquid which is poured in at the top: preferably water to be filtered, passes into the filter device through the liquid intake openings 13 in the cover 7 which are also referred to as sieve slots, it flows through the sieve 9 and the filter material 1, and it leaves the through-flow cup 2 through the outlet opening 4 which also retains the filter material 1 by means of a sieve at the bottom end.

If a portion of the circular disc in FIG. 2 which is identified by inclined hatching is considered, being therefore a broken-away part of a flat textile article 19, with the ribs 20 and the annular rib 21 being omitted, we then see the flat textile article 19 of the sieve 9 which in this embodiment is a hybrid cloth 23 with hydrophilic fibres 24 and hydrophobic fibres 25. Pure hydrophilic regions 27 occur where hydrophilic fibres 24 cross with hydrophilic fibres 24 at 90°. Pure hydrophobic regions 26 occur where the hydrophobic fibres 25 shown in white in FIG. 4 cross with other hydrophobic fibres 25 which extend perpendicularly thereto. When a relatively large region as shown in FIG. 5 is considered, it can be seen that the areas illustrated therein by white rectangles represent those hydrophobic regions 26. Correspondingly, the black rectangles are the hydrophilic regions. Therebetween there are the mixed or hybrid regions 28 which cannot be avoided in the case of a canvas cloth comprising two kinds of fibres or threads 24, 25.

In an enlarged view of the hybrid cloth 23 in FIG. 4 it is also possible to see the pores 29, the size of which in the illustrated example is 30 $\mu$m by 30 $\mu$m.

It will be appreciated that the hybrid cloths 23 shown in FIGS. 4 and 5 can be produced with support ribs 20, 21 in the form of a one-piece sieve 9 corresponding to the hatched region in FIG. 2.

What is claimed is:

1. A through-flow cup which can be filled with a granular material and through which a liquid to be treated can flow, said cup having side walls and sieves which are disposed at ends thereof so that liquid can flow through the granuler material in the interior of the through-flow cup, at least one sieve having a flat textile article comprising plastic fibres of at least two different kinds of plastic fibre containing hydrophilic components and the other kind of plastic fibres containing hydrophobic components.

2. A through-flow cup according to claim 1, wherein the flat textile article of the sieve is a hybrid cloth made up of hydrophilic and hydrophobic fibres.

3. A through-flow cup according to claim 1, wherein the hybrid cloth has pure hydrophilic and pure hydrophobic regions.

4. A through-flow cup according to claim 2, wherein the hybrid cloth has pure hydrophilic and pure hydrophobic regions.

5. A through-flow cup according to claim 1, wherein the plastic material of the hydrophilic fibre contains polyester (PES) or polyamide (PA) and the plastic material of the hydrophobic fibre contains polypropylene (PP) or polyethylene (PE).

6. A through-flow cup according to claim 2, wherein the plastic material of the hydrophilic fibre contains polyester (PES) or polyamide (PA) and the plastic material of the hydrophobic fibre contains polypropylene (PP) or polyethylene (PE).

7. A through-flow cup according to claim 3, wherein the plastic material of the hydrophilic fibre contains polyester (PES) or polyamide (PA) and the plastic material of the hydrophobic fibre contains polypropylene (PP) or polyethylene (PE).

8. A through-flow cup according to claim 4, wherein the plastic material of the hydrophilic fibre contains polyester (PES) or polyamide (PA) and the plastic material of the hydrophobic fibre contains polypropylene (PP) or polyethylene (PE).

9. A through-flow cup according to claim 1, wherein the hydrophilic fibre comprises a hydrophilised plastic material and the hydrophobic fibre comprises a hydrophobised plastic material.

10. A through-flow cup according to claim 2, wherein the hydrophilic fibre comprises a hydrophilised plastic material and the hydrophobic fibre comprises a hydrophobised plastic material.

11. A through-flow cup according to claim 3, wherein the hydrophilic fibre comprises a hydrophilised plastic material and the hydrophobic fibre comprises a hydrophobised plastic material.

12. A through-flow cup according to claim 5, wherein the hydrophilic fibre comprises a hydrophilised plastic material and the hydrophobic fibre comprises a hydrophobised plastic material.

13. A through-flow cup according to claim 8, wherein the hydrophilic fibre comprises a hydrophilised plastic material and the hydrophobic fibre comprises a hydrophobised plastic material.

14. A through-flow cup according to claim 1, wherein the flat textile article of the sieve is connected to support ribs by injection moulding, welding or gluing.

15. A through-flow cup according to claim 2, wherein the flat textile article of the sieve is connected to support ribs by injection moulding, welding or gluing.

16. A through-flow cup according to claim 3, wherein the flat textile article of the sieve is connected to support ribs by injection moulding, welding or gluing.

17. A through-flow cup according to claim 5, wherein the flat textile article of the sieve is connected to support ribs by injection moulding, welding or gluing.

18. A through-flow cup according to claim 9, wherein the flat textile article of the sieve is connected to support ribs by injection moulding, welding or gluing.

19. A through-flow cup according to claim 1 wherein the size of the pores of the flat textile article is between 10 $\mu$m to 200 $\mu$m.

20. A through-flow cup according to claim 2 wherein the size of the pores of the flat textile article is between 10 $\mu$m to 200 $\mu$m.

21. A through-flow cup according to claim 3 wherein the size of the pores of the flat textile article is between 10 $\mu$m to 200 $\mu$m.

22. A through-flow cup according to claim 5 wherein the size of the pores of the flat textile article is between 10 $\mu$m to 200 $\mu$m.

23. A through-flow cup according to claim 9 wherein the size of the pores of the flat textile article is between 10 $\mu$m to 200 $\mu$m.

24. A through-flow cup according to claim 19 wherein the size of the pores of the flat textile article is between 20 $\mu$m and 100 $\mu$m.

25. A through-flow cup according to claim 9 wherein the size of the pores of the flat textile article is between 20 $\mu$m and 100 $\mu$m.

* * * * *